Jan. 5, 1932.  A. D. JENNINGS  1,839,318
TIME STUDY METHOD AND APPARATUS
Filed Aug. 6, 1929   2 Sheets-Sheet 1
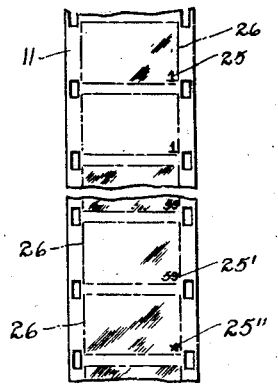
FIG_1
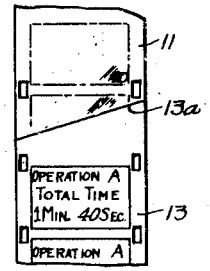
FIG_2
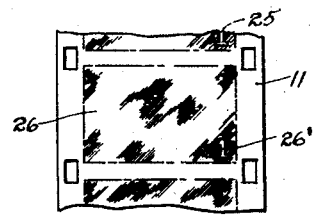
FIG_3
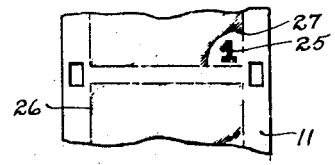
FIG_4
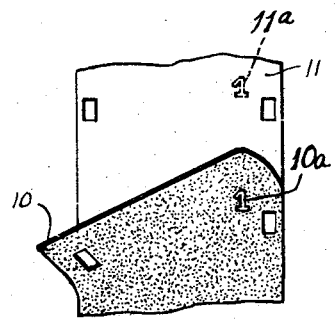
FIG_5
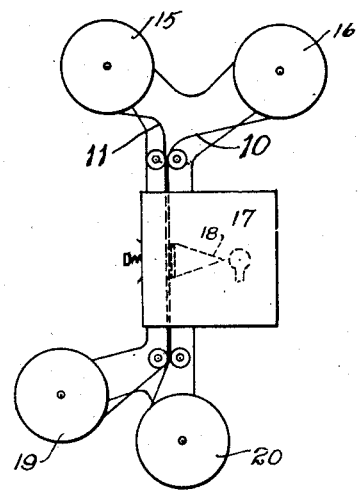
FIG_6
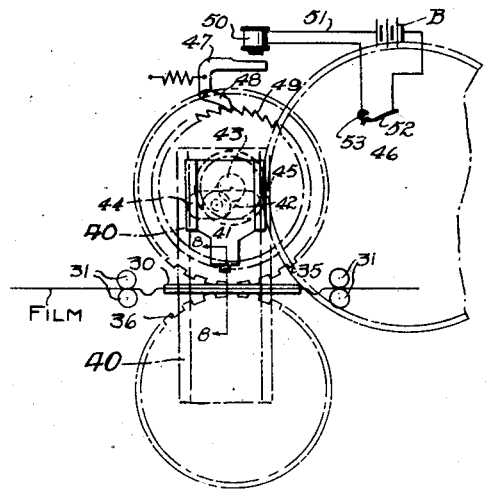
FIG_7
Inventor
Allen D. Jennings
By Bates, Golrick & Teare
Attorneys Jan. 5, 1932.  A. D. JENNINGS  1,839,318
TIME STUDY METHOD AND APPARATUS
Filed Aug. 6, 1929  2 Sheets-Sheet 2
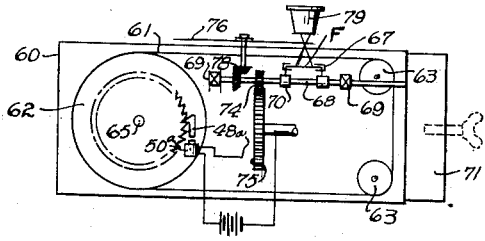
FIG_9
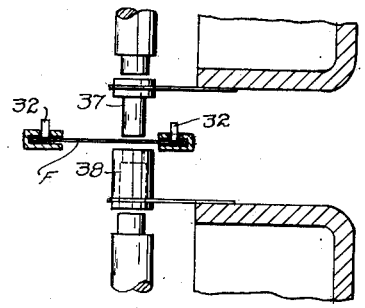
FIG_8
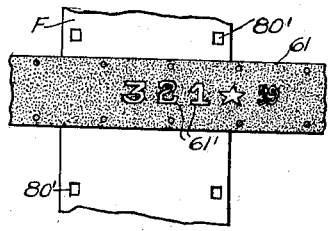
FIG_10
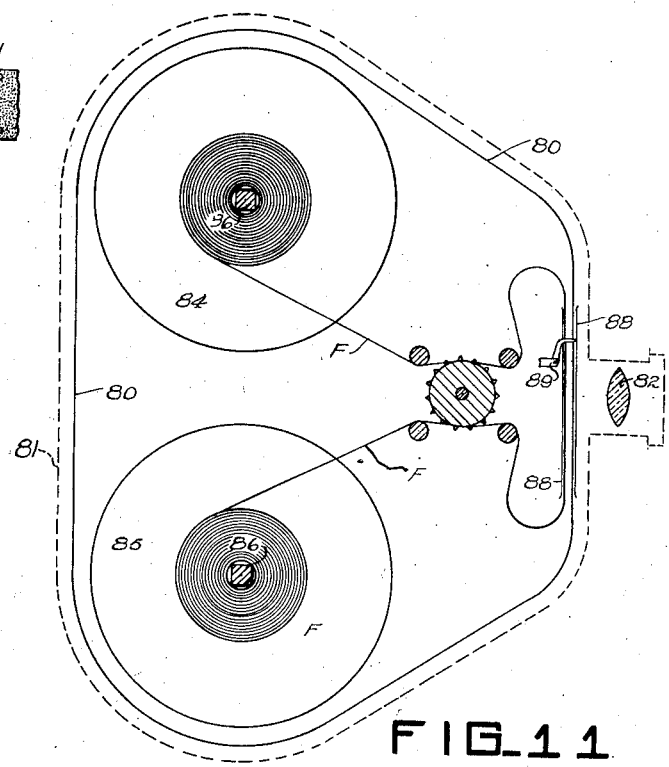
FIG_11
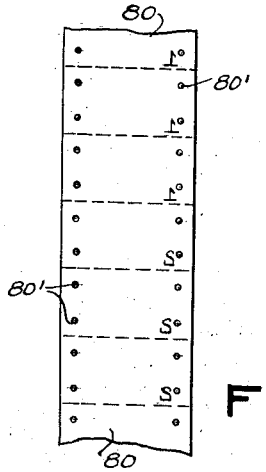
FIG_12
Inventor
Allen D. Jennings
By Bates, Golrick & Teare
Attorneys Patented Jan. 5, 1932

1,839,318

UNITED STATES PATENT OFFICE

ALLEN D. JENNINGS, OF CHAGRIN FALLS, OHIO

TIME STUDY METHOD AND APPARATUS

Application filed August 6, 1929. Serial No. 383,941.

The primary object of this invention is to provide a simple and efficient time study method.

A further object is to provide a time study method and apparatus which may be effectively used to permanently record the movements of an operative, for example, without emphasizing to the operative the fact that he is being timed.

A further object is to provide a time study method, using an ordinary motion picture camera which may be practiced substantially without modification and/or special adaptation of such camera.

Further objects include the provision of a motion picture film for use in connection with ordinary motion picture producing and projecting equipment, which film will be comparatively inexpensive to produce and which will render such equipment entirely suitable for accurate time study work.

The primary feature of the invention is that I treat a motion picture film in such manner that when the film is exposed as by a suitable camera to take action pictures, the film will embody, and may be used to project an accurate record of, the time used in taking such pictures, together with the pictures, onto a suitable screen.

The use of motion pictures for time study has been previously proposed. The best known method consists in photographing the face of a clock or watch, together with the subject to be timed: The main disadvantage of methods using a clock or watch is that the subject, an operative in a factory for example, knows he is being timed and this results in a certain amount of prejudice on part of the operative, and otherwise interferes with effective time study.

A modification of the above method consists in closely associating the time piece with the camera in such manner that it is ordinarily unobserved by the subject photographed. With such arrangements, the dial and hands of the time piece are photographed on the film, usually by special lens devices in addition to the lens device used for the main subject. This modification calls for very expensive equipment and at best the timing element (the time piece for example) is hard to conceal from the view of the subject. In other words, he usually knows that his movements or operations are being timed for future analysis. By the use of my invention the necessity for special cameras, i. e. equipped with a timepiece or equivalent device, is done away with, while at the same time there is no timing element observable by the subject being photographed.

As previously stated, the invention includes specially prepared film. This preparation may be accomplished in a variety of ways, the most practical of which (now known to me) will be presently described in connection with the accompanying drawings. Other features of the invention, as well as further objects thereof, will hereinafter appear.

In the drawings, Fig. 1 is a plan view of two portions of a film showing a suitable arrangement of time symbols; Fig. 2 shows a small section of an analyzed and edited film; Figs. 3 and 4 show modifications of the invention, particularly with relation to the formation of time symbols; Fig. 5 is a fragmentary view showing one step in the preferred method of producing films with time symbols thereon; Fig. 6 is a diagrammatic side elevation of a suitable apparatus for producing time study film by photo-printing the time symbols or characters thereon as by means of a master film; Fig. 7 shows a suitable apparatus for either printing the time symbols onto the film or for perforating or impressing the film with suitable symbol punches or dies; Fig. 8 is a detail sectional view of the apparatus of Fig. 7 taken along the line 8—8 on Fig. 7; Fig. 9 is a diagrammatic view of a modified apparatus for photo-printing the time symbols or characters on the film; Fig. 10 is an enlarged view of a suitable master element for photo-printing as in the apparatus of Fig. 9 and a portion of the film being printed; Fig. 11 is a diagrammatic view of a time element device for association with an ordinary camera, the latter also being shown diagrammatically, and Fig. 12 is a fragmentary elevation of one of the elements of the device shown in Fig. 11.

I desire it to be understood that the term

"time symbol" as herein used is not to be limited by the illustrations shown, either as to the character of the symbols, which may be letters, numbers or arbitary signs, or as to the illustrated arrangement on the films. In arrangement, the symbols may be placed on the film in any desired location where they will be projectable, and a complete series of symbols may represent any desired period of time. A selected complete series may, for example, run the entire length of the film without repetition, or the series may repeat each one minute interval, as illustrated in Figs. 1 and 10, irrespective of the length of the film.

As a method, the invention comprises marking whatever portions of the film it is desired to analyze with suitable characters or symbols preferably prior to generally exposing the film, in such manner that the film, when generally exposed and developed, will furnish complete data for a careful and complete analysis of the movements photographed. The method is capable of considerable modification and refinement. In carrying out the method, any suitable apparatus may be used.

As shown in Fig. 6, an ordinary duplex-printer may be used to prepare film for subsequent time study use. In such apparatus, a master film or strip 10 may be progressively passed over a sensitized undeveloped film 11 and subjected to light treatment, in such manner that the film 11 will have spaced areas 11a exposed in accordance with an arrangement of symbols 10a on the master.

The symbols may comprise a series of characters "1" for the first set of frames to be subsequently exposed for one second of time, say on the first 16 or 32 frames, depending on the number of frames per second the camera is adapted to feed. The next equal number of frames will be marked "2", and so on up to any desired number, say "60", representing one minute.

The master film or strip may comprise a generally opaque body with transparent areas for the time symbols. The latter could obviously be made transparent as by light treatment on a sensitized surface or punched out as by suitable dies. As shown, the films 10 and 11 are contained on suitable spools 15 and 16 passed through a light box 17 in mutually overlying relation and rewound by suitable mechanism (not shown) on spools 19 and 20. Associated with the light box are suitable mechanisms to cause intermittent exposure of the frames to light, as from a light source 18.

Such mechanisms are well known in this art and need no detailed illustration. The film feeding means (not shown) should be, of course, in geared and synchronized relation to the means for supplying light, such as the usual revolving shutter (not shown).

The film 11, after having passed entirely through the light box, may now be placed in a suitable camera exactly like an ordinary film and generally exposed to take action pictures. Fig. 1 is a partial illustration of the completed and developed film. In this figure, the time symbols 25 are shown as within the picture areas 26 and at one corner thereof. 25' represents the symbols near the end of a series and 25" designates an arbitrary sign indicating the end of the series.

It may be here noted that if the film 11 is of the so called "reversible" character, wherein the photo-chemical changes in the sensitized surface are substantially the reverse of those in the ordinary film, this film may be used to project the picture onto a screen. Otherwise, of course, a positive must be made to reverse the light and dark areas.

The film is now ready for time analysis. If the film is to be used for instruction purposes, it is, of course, edited and preferably titled. Fig. 2 shows the manner in which title strips may be made up to explain the operations photographed, etc., and to show the total time of an operation. The title strip 13 is shown as spliced to the active subject recording portion of the film at 13a.

It will be understood that, generally, it is immaterial whether the symbols project as light or dark areas on a screen, since in either case there will be sufficient contrast between the symbols and background to permit the symbols to be easily read. Assuming the film shown in Fig. 1 is an ordinary negative film and that the symbol areas have been previously exposed to very intense light, then the symbols will appear substantially black on the developed negative. The general exposure will not, as a matter of course, be nearly as intense, hence the contrast. The same contrast effect may be had with ordinary film by ink printing the symbols thereon. When the positive or reverse is made, the symbols will, of course, be light on a darker background.

Fig. 3 may be taken to illustrate (a) the positive made from the film shown in Fig. 1; (b) a "reversible" film, i. e. one which needs no positive prior to projection, in which the symbols are formed as by photo-printing in accordance with Figs. 5 and 6, or (c) any sort of film with the symbols punched therethrough.

Greater contrast may be had by special treatment of a small portion of each frame surrounding the symbol; for example, see the area 27 in Fig. 4. Thus, suppose the film is prepared by photo-printing from a master having dark symbols and surrounding transparent areas. Then obviously, a light guard or equivalent device would be used either as an attachment for the printing apparatus or embodied in the master. No illustration of such master is deemed necessary, since this, if used, may be substantially a replica of the film shown in Fig. 4, insofar as light and dark effects are concerned. The light guard of the apparatus would comprise simply a shield (not shown) confining the light exposure to the film areas immediately surrounding the symbols reproduced on the film.

In Figs. 7 and 8, I have shown a suitable apparatus for preparing time study film, for use in an ordinary motion picture camera, or for preparing master films for photoprinting such ordinary films to the same end. As shown, this comprises a suitable guide 30 for the film, equipped with film feeding means, such as rollers 31 and step-by-step feeding pawls 32 (Fig. 8). This portion of the mechanism may be supported and driven in any suitable known manner. 35 and 36 indicate suitable rotary supports for imprinting or perforating members, such as dies as illustrated. The die elements, as shown particularly in Fig. 8, comprise suitable male dies 37 and female dies 38, arcuately arranged about respective drums, each pair of dies being for punching or marking a different symbol or character on the film, designated diagrammatically at F.

Suitably arranged in guideways, diagrammatically indicated at 40, are die actuating members or plungers, one being shown at 41. The die actuating members may be reciprocated toward and away from the dies, as by means of cranks, one being shown at 42 on a power shaft 43. The crank ends may operate in suitable transverse slots in the die plungers 41, one being shown at 44. The die carriers are loose on respective shafts 43 and may be advanced in timed relation to the movement of the film, as by means of a suitable ratchet mechanism and reduction gearing arrangement.

The ratio of the reduction gearing which, as shown, comprises a pinion 45 on the power shaft 43 and a gear 46 in mesh with the pinion and supported on a suitable shaft and bearings (not shown), is determined by the number of film frames which will ultimately be fed per second in the camera. For example, if sixteen frames are to be fed per second then the ratio of the pinion and gear would be 1 to 16. It would follow that for each sixteen impressions or punches, one for each film frame, the gear 46 would move through one complete rotation. Thus, on each complete turn of the gear 46 a ratchet mechanism may be actuated to advance the dies one step, as for changing from one symbol to another as soon as a given symbol has been impressed or punched sixteen times.

The ratchet device may comprise a suitably supported lever 47 carrying a feed pawl 48 operating in suitable teeth 49 on a toothed wheel rigid with the drum 35. The lever 47, as shown, has an arm underlying an electro-magnet 50 having an electric circuit 51, which includes a suitable source of power, such as B, arranged to be established as by a brush 52 in the circuit and carried on the gear 46 for coaction with a stationary contact 53, also in the circuit.

Obviously, the impressions made by the apparatus just described may be simple indentations on the film, in which case, upon subsequent exposure, development and projection, the characters or symbols will be quite legible on the screen, because of diffusing the light passed through the film. Incidentally, in the event a positive is made from such film, this positive will have the character or symbol effects translated thereto in the light printing processes.

In case the film is actually punched for the symbols then this film may be used directly in a camera or used as a master film for marking ordinary films prior to ordinary exposure and development, as previously described.

Instead of punching or indenting the film by means of such apparatus as shown, a suitable inking device, such for example as an ink ribbon, operated similarly to a typewriter ribbon, may be passed between character bearing die and the film, so as to supply the film with time symbol markings substantially throughout its length. This needs no pictorial illustration, because the only modification that would be necessary would be to provide type members in the place of the dies 37 and suitable platen support members for the film in place of the female dies 38, see Figs. 7 and 8.

Instead of printing with ink or other opaque medium, I may, if desired, print on the undeveloped film with a suitable solution of fixer, such as hyposulphite of soda. This will stay the subsequent changes in the sensitized part of the film thus printed to bring out the time symbols in contrast with the pictures.

In Fig. 9, I have shown an apparatus for photo-printing time symbols on a film by means of a continuous belt bearing the time symbols. This apparatus comprises a light box, diagrammatically illustrated at 60, wherein there is a flexible belt 61 mounted on suitable driving and supporting rollers 62 and 63. The belt may be generally opaque, as shown in Fig. 10, and have the time symbols, either as perforations or transparent areas 61'. The roller 62, which is shown as supported on a suitable shaft 65, may be intermittently turned by a ratchet mechanism, including a magnet 50a and pawl 48a, essentially similar to the magnet and pawl arrangement illustrated in Fig. 7. The film to be printed, designated F, as shown, passes transversely of the belt 61 and close thereto in suitable guides shown at 67. Below the guides there is a shaft 68 in suitable bearings, diagrammatically illustrated at 69, and the shaft is arranged to drive film feeding pawls, diagrammatically shown at 70, for advancing the film F through the guides step-by-step. Power for the shaft 68 may be supplied by means of a spring motor and gearing, not shown in detail but the position of which is indicated at 71.

The shaft 68 may drive the controlling switch for the magnet 50a by means of reduction gearing 74, 75, and may also drive a light shutter 76 through bevelled gearing 78. The light source, indicated diagrammatically at 79, is rendered effective by the shutter to print the symbols 61' onto the film F in the desired location as each frame on the film is presented in proper relation to the symbol on the belt.

In Figs. 11 and 12, I show a device for imprinting time symbols on a motion picture film simultaneously with the general exposure thereof. This device, in addition to the ordinary camera parts, comprises a continuous belt 80, arranged to be threaded through the ordinary gate of the camera in superposed relation to the ordinary film. In Fig. 11, 81 is the casing of the camera, 82 the lens, which would, of course, be equipped with an automatically operated shutter (not shown), 84 and 85 are film spools and 86 is the usual driving arrangement for the film. The ordinary film is indicated at F. 88 represents, diagrammatically, the gate of the camera and 89 the usual film driving pawl arrangement. It will be understood that the pawl arrangement is such that each pawl projects through the ordinary film openings as well as through correspondingly placed openings 80' in the belt 80.

By the arrangement shown in Figs. 11 and 12, an ordered series of time symbols may be projected onto the film F simultaneously with the general exposure of this film. Such time belt 80 may lie entirely within the walls of the camera casing in embracing relation to the film containing spools and film driving mechanism. With this arrangement, the series of symbols is comparatively short, since ordinarily not more than 100 frame lengths may be contained in the camera in this manner. A suitable arrangement is to have the symbols repeat after each four or five second interval, depending on the length of belt the camera will accommodate. For example, the first sixteen frame spaces on the belt will contain the symbol "1", the next sixteen, the symbol "2" and so on up to "4", assuming the belt may be so arranged that it takes just four seconds to feed the entire belt through the gate.

In editing a film marked with symbols from a time belt, such as shown in Figs. 11 and 12, it is somewhat more difficult to totalize the entire time for long operations photographed. However, this disadvantage is somewhat compensated for since the time belt enables a motion picture equipment operator to take time study films without the use of specially prepared films, as with the previously described method and apparatus.

In lieu of the time belt, such as 80, I may provide a full length film having a suitable series of time symbols thereon, say black characters on the transparent film background. Such film would, of course, be double threaded through the gate of the camera, exactly as shown in Fig. 11, and could be supported on separate spools either within or outside of the camera or, if desired, on the same spools which support the ordinary film F in Fig. 11, such as the spools 84 and 85. For such an arrangement, the time symbol film could be prepared as above described in connection with Fig. 5, wherein the film 11 would be developed after light exposures of only the symbols, so that all except the symbol bearing portions of the film 11 would be transparent.

It will be understood that careful calibration of the motion picture camera is essential, so that desired number of frames per second will be exposed. Some cameras now on the market may, by comparatively simple adjustments, be caused to operate with substantially the accuracy of a stop watch. A suitable camera calibrating or adjusting device may be found in the disclosure of the patent to A. S. Howell, No. 1,620,726, as well as numerous other issued patents.

I claim:

1. A motion picture time study method, which consists in providing a motion picture film, with an ordered series of time indicating symbols, exposing the film to take pictures, in a camera adjusted to expose a predetermined length of film within a unit of time measurement, in coordination with the arrangement of such time symbols on the film, and finally developing the film and projecting the same to cause the time symbols and pictures to appear simultaneously on a screen.

2. The method of preparing motion picture film for time study use, comprising, exposing portions of the picture recording areas of the film to the exclusion of substantially all other portions thereof to an ordered series of time indicating symbols arranged with specific relation to a predetermined rate of feeding and exposing film in a camera to cause the time symbols to be photo-printed on such exposed areas, thereafter exposing the film at said rate to active subjects to be timed, and thereafter developing the entire film to fix both exposures.

3. A time study motion picture film, comprising the usual strip of sensitized transparent material, provided with feeding perforations, which material prior to active subject taking exposure bears in substantially identical locations on the picture recording areas an ordered series of time recording symbols, representing the periods of time to be used in exposing unit length parts of the film.

4. A photographic time study method, comprising, photo-printing a progressive series of time indicating characters or symbols on a sensitized motion-picture film, prior to the general exposure thereof to take pictures, while guarding substantially the entire film exclusive of the character printed portions against exposure, thereafter exposing the film to take pictures of the subject to be studied at a speed definitely related to the time unit indicated by the printed characters and then developing the film to fix both exposures.

5. A time study method, comprising arranging a series of progressively changing time symbols on a motion picture film specifically in relation to the number of frames to be exposed in the camera within a definite time unit, calibrating a camera to cause it to expose such number of frames within a definite time unit, exposing the film in the calibrated camera and thereafter using said exposed film as an accurate time and motion record of the operations therein recorded, the method being particularly characterized in that the camera mechanism displaces the usual chronometer.

6. A method of timing and recording the movements of an operation consisting in providing an ordered series of time symbols on a motion picture film prior to development and general exposure specifically in relation to the number of film frames to be exposed within a definite time unit, exposing such film to photograph such movements in a camera calibrated to expose such number of film frames as aforesaid, and thereafter using the exposed film to analyze such movements of the operation.

7. A time study method, which consists in treating a motion picture film to provide a repeating series of time symbols thereon, in accordance with a definite number of film frames to be exposed within a definite time unit, taking active subject pictures by means of such film in a camera calibrated to expose such definite number of frames, developing the film, and thereafter using the time symbols in analyzing the operations recorded on the film as an accurate time and motion record of even the smaller motions which collectively make up larger operations.

8. In a motion picture time recording apparatus, a time symbol recording element, and an ordered series of symbol indentations thereon, a motion picture film having the usual picture recording areas, and means for photo-printing said indentations on said picture recording areas of the film whereby the symbols will be diffused on such areas without materially obliterating the active subject pictures.

9. A motion picture time recording element, comprising a film adapted to be fed through a motion picture apparatus, said film bearing thereon, within the picture recording areas thereof, an ordered series of substantially non-contrasting diffused symbols in superposed relation to the pictures of the subject to be studied, which symbols and pictures are visible for time analysis without obscuring each other.

10. A motion picture time study method, comprising marking motion picture film with an ordered arrangement of projectable time symbols predetermined for coordination with a selected speed of feeding and exposing film in a camera, exposing the film to take action pictures in a camera adjusted to expose a predetermined length of film within a unit of time measurement, and finally projecting the film to cause the time symbols and pictures to appear simultaneously on a screen.

11. A time study method comprising arranging a series of time symbols on a motion picture film specifically in relation to a predetermined exposure rate, calibrating a motion picture camera to cause it to feed and expose film at such rate, exposing the film in the calibrated camera to take pictures of the subject to be studied, and using the film as an accurate time and motion record of the subject.

In testimony whereof, I hereunto affix my signature.

ALLEN D. JENNINGS.